United States Patent [19]
Powaska

[11] 3,985,374
[45] Oct. 12, 1976

[54] AUTOMOBILE PASSENGER'S INDIVIDUAL TABLE

[76] Inventor: Tadeusz Powaska, c/o George Spector, 3615 Woolworth Bldg., 233 Broadway, New York, N.Y. 10007

[22] Filed: July 7, 1975

[21] Appl. No.: 593,793

[52] U.S. Cl. .............................. 280/730; 280/736; 280/751; 248/240.4
[51] Int. Cl.² ......................................... B60R 21/10
[58] Field of Search.......... 280/150 AB, 150 B, 730, 280/736, 751; 108/106–109; 211/90, 103; 297/163; 248/243, 240.4

[56] References Cited
UNITED STATES PATENTS

| | | | |
|---|---|---|---|
| 1,398,496 | 11/1921 | Saltalamchia...................... | 297/163 |
| 2,056,078 | 9/1936 | Slater.............................. | 108/107 X |
| 2,322,755 | 6/1943 | Voorhies.......................... | 280/150 B |
| 2,619,395 | 11/1952 | Kent ............................... | 297/146 X |
| 2,654,616 | 10/1953 | Mockli............................ | 280/150 B |
| 2,749,143 | 6/1956 | Chika.............................. | 280/150 B |
| 2,768,003 | 10/1956 | Abel et al........................ | 280/150 B |
| 3,198,543 | 8/1965 | Presunka......................... | 280/150 B |
| 3,203,709 | 8/1965 | Presunka......................... | 280/150 B |
| 3,518,349 | 11/1964 | Bergstrom......................... | 248/243 |
| 3,650,223 | 3/1972 | Kobori ............................ | 280/150 B |

Primary Examiner—Kenneth H. Betts

[57] ABSTRACT

A retractable table located in front of each passenger of an automotive vehicle, so that a person can write a letter or place a meal thereupon; the table being made of soft rubber material so to cushion a person while holding him from being thrown forwardly in case of a car collision, the table being pivotably supported at its forward end so to be swinged upwardly into a stored, out-of-the-way position when not needed.

3 Claims, 6 Drawing Figures

U.S. Patent    Oct 12, 1976    3,985,374
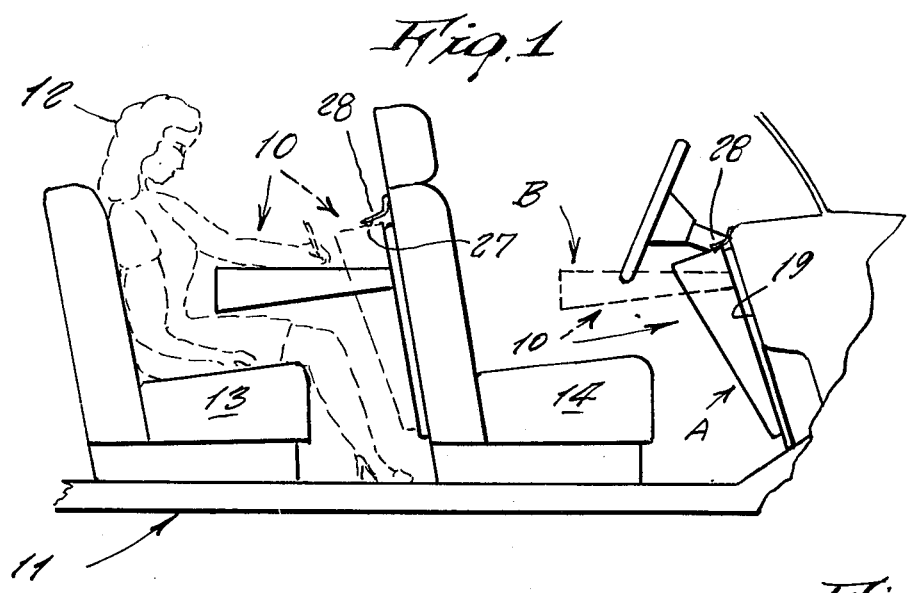
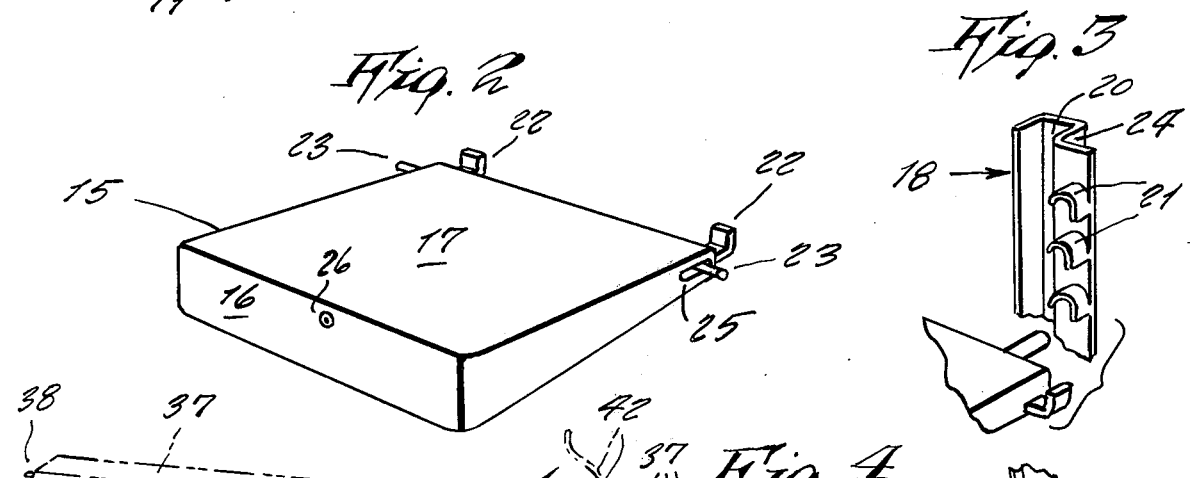
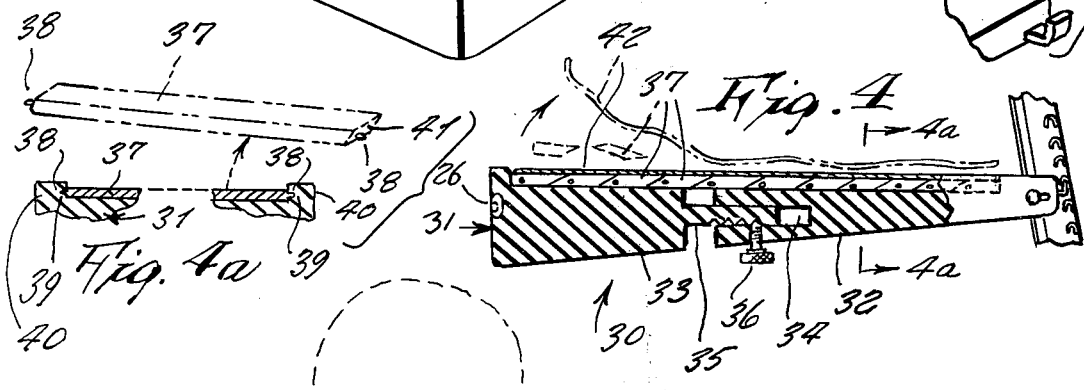
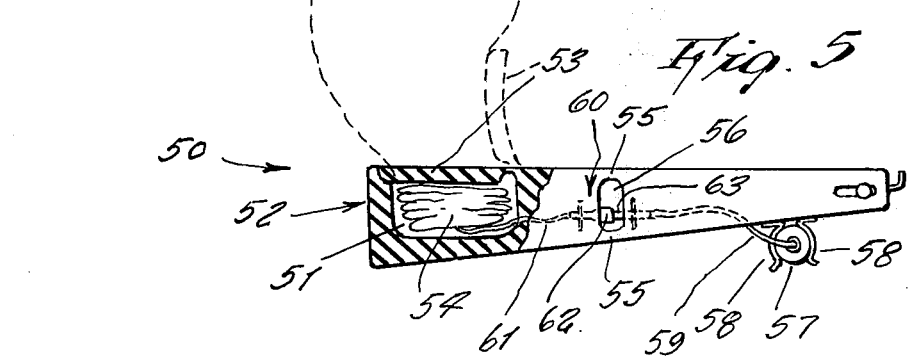

AUTOMOBILE PASSENGER'S INDIVIDUAL TABLE

This invention relates generally to automotive accessories.

A principal object of the present invention is to provide an individual table for each passenger inside a car, so that he can comfortably have a place where he can write a letter, place a meal, or place work thereupon instead of holding the same uncomfortably in his lap, and which when not needed can be stored out of the way.

Another object is to provide an automobile passenger's individual table which in a utility position serves to cushion and hold a person from being thrown forwardly in case of a car collision.

Still a further object is to provide an automobile passenger's individual table which in a modified design thereof has a hard writing surface even though the table is made of a soft rubber so to cushion the person.

Still another object is to provide an automobile passenger's individual table which in a further modified design is telescopic and also includes a collision air bag therewithin that pops out automatically from its upper surface when a person's weight is thrust against the table rear edge, so to protect the person more thoroughly.

Other objects are to provide an automobile passenger's individual table which is simple in design, inexpensive to manufacture, rugged in construction, easy to use and efficient in operation.

These and other objects will be readily evident upon a study of the following specification and the accompany drawing wherein:

FIG. 1 is a side view of the invention.

FIG. 2 is a perspective view of one of the car tables.

FIG. 3 is a detail of a supporting rail structure for the table.

FIG. 4 is a side cross section showing a modified design in which a hard writing surface is provided on the relatively soft rubber table, and which consists of steel flat strips that do not flex and which are under a flexible hard surface plastic sheet which together with the steel strips pop out of the top of the table in case the table is compressed against a person during a collision so to allow the table to softly cushion the person.

FIG. 4a is a side cross section thereof on line 4a—4a of FIG. 4.

FIG. 5 is a side view of another modified design in which an air bag inside the table pops upward in case of a collision so to protect a persons head, the bag being inflated automatically by a compressed valve connected to a compressed air cylinder.

Referring now to the drawing in detail, and more particularly to FIGS. 1 to 3 at this time, the reference numeral 10 represents an automobile passenger's individual table according to the present invention wherein the same is installed in an automobile 11 for use by passengers 12 on a rear seat 13 as well as a passenger on right front seat 14 next to a driver.

The table is accordingly located in front of the passenger and is pivotable between a stowed away, upwardly pivoted position A and a utility horizontal position B.

The table consists of a table top 15 molded of resilient rubber material and which has a relatively thick edge 16 so to be comfortable to the passenger in case he is thrust thereagainst during a collision. It also includes a flat, broad table top surface 17 upon which work may be done or food may be served.

The table top is supported in a pair of vertical rails 18 secured either against the rear side of the front seats or else on the dashboard 19. Each rail, made of configurated steel includes a vertical channel 20 and a row of inverted, U-shaped hooks 21. The table top 15 has a pair of upwardly turned hooks 22 protruding from a rear end, the hooks being engageable with an underside of a selected ones of the hooks 21. The table top also has a transverse metal rod 23, the opposite ends of which can are freely slidable in the vertical channels of the rails. It is now evident that the table top can be supported at any desired elevation by pivoting the table top in vertical position about the axis of the rod so the hooks 22 disengage hooks 21, and the rod ends can thus slide vertically in the channels to a desired elevation, after which the table top is swung downward so that each of the hooks 22 swing under a selected one of the hooks 21 and is retained thereby. The table top 15 is retained from dropping lower than a horizontal position by means of the ends of the rod 23 bearing against a side wall 24 of the channels 20. As shown in FIG. 2, the table top 15 may have a wide slot 25 through which the rod extends so to allow movement between the parts sufficiently in order to maneuver the pivotal movements. A snap fastener 26 on end wall 16 of the table top is engagable with snap fasten 27 on a strap 28 secured to the car front seat or dashboard so to hold the device in stored position.

In FIGS. 4 and 4a, a modified design 30 of the invention incorporates the table top 31 to be made in two sections 32 and 33 that are telescopically adjustable so to accommodate stout or thin persons. Section 32 has a groove 34 in which a tongue 35 of section 33 is slidable, the underside of the tongue having inverted V-shaped notches for being engaged by a set screw 36 threaded in section 32.

The upper surface of table top 31 is formed with a hard surface good for writing upon, and which even though hard is readily collapsible in case a person is thrust against the table top in a collision. The hard surface is formed by a set of flat steel bars 37 having parallel, sloping front and rear longitudinal edges. Each bar 37 has a protruding extension 38 at each end that fits into a long groove 39 in each side bead 40 of the table top 31 made of resilient rubber. As shown, the extension 38 is close to one end of the bar end wall 41, so that in case a collision occurs, the person is thrust against the table top causing it to squeeze together due to its resilient rubber construction, and the bars thus each pivot upwardly about the axes of the protruding extensions 38 so to contract the table top hard surface. The extensions being short, thus permits the bars to readily snap out of the grooves 39. Thus the table top with a hard writing surface can readily collapse. A flexible hard surfaced plastic sheet 42 may be adhered to the upper side of the bars so to cover the joints between the bars, and prevent them to fly about dangerously once dislodged from the table top during a collision.

In FIG. 5 another design 50 of the invention includes a chamber 51 inside the resilient rubber table top 52 and which is normally covered by a top flap 53 that forms a part of the top surface of the table top. An uninflated air bag 54 is contained in the chamber. The table top 52 has a weakened portion 55 formed by means of a wide hole 56 extending transversely through the table top, so that upon collision impact this weakened portion is certain to contract.

A compressed gas cylinder 57 is secured in clamps 58 underneath the table top, and a flexible hose 59 extends therefrom to a valve 60 located at the weakened portion. Another flexible hose 61 from the valve extends to the air bag. The valve includes tubes 62 and 63 that are telescopic so to release the valve.

Accordingly, in case of a collision, the valve parts slide together, opening the valve so compressed gas inflates the air bag which thus lifts the top flap to allow the bag to extend upward during inflating, and thus protects the person's head as he is thrust forwardly.

Thus modified designs are provided.

While various changes may be made in the detail construction, it is understood that such changes will be within the spirit and scope of the present invention, as is defined by the appended claims.

What is claimed is:

1. In an automobile passenger's individual table the combination of a table top pivotably located in front of passengers of a car, and a pair of stationary rails in which said table top is vertically adjustable and pivotable between an upward vertical stored position and a rearwardly downwardly horizontal utility position, said table top being made of resilient rubber having a transverse pivot rod near one end extending through a slot, the ends of said rod protruding from each opposite side of said table top and a pair of hooks located on said one end of said table top, said rails being formed of configurated steel and each including a vertical channel in which said rod ends are vertically slidable and a vertical row of inverted U-shaped hooks for being selectively engaged by said table top hooks for retaining said table top in said horizontal position.

2. The combination as set forth in claim 1 wherein said table top is comprised of telescopic sections having an interfitting tongue and groove arrangement for permitting securement together in selected positions.

3. The combination as set forth in claim 1 wherein said table top includes a transverse weakened portion for being compressed when squeezed, an air valve bridging said weakened portion and being along an air line between a cannister of compressed air and an uninflated air bag in a chamber formed in said table top, said chamber being closed by an upwardly pivotable flap of said table top when in a horizontal position.

* * * * *